(12) United States Patent
Mou et al.

(10) Patent No.: US 12,450,868 B2
(45) Date of Patent: Oct. 21, 2025

(54) IMAGE RETRIEVAL METHOD AND APPARATUS, STORAGE MEDIUM, AND DEVICE

(71) Applicant: TENCENT TECHNOLOGY (SHENZHEN) COMPANY LIMITED, Guangdong (CN)

(72) Inventors: Shuai Mou, Guangdong (CN); Wan Peng Xiao, Guangdong (CN); Qi Ju, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 905 days.

(21) Appl. No.: 17/683,777

(22) Filed: Mar. 1, 2022

(65) Prior Publication Data

US 2022/0222918 A1 Jul. 14, 2022

Related U.S. Application Data

(63) Continuation of application No. PCT/CN2020/126086, filed on Nov. 3, 2020.

(30) Foreign Application Priority Data

Feb. 12, 2020 (CN) .......................... 202010088101.4

(51) Int. Cl.
*G06V 10/00* (2022.01)
*G06F 16/532* (2019.01)
(Continued)

(52) U.S. Cl.
CPC .......... *G06V 10/757* (2022.01); *G06F 16/532* (2019.01); *G06F 16/55* (2019.01);
(Continued)

(58) Field of Classification Search
CPC .. G06V 10/757; G06V 10/762; G06V 10/462; G06V 10/761; G06V 10/82;
(Continued)

(56) References Cited

U.S. PATENT DOCUMENTS

2015/0154229 A1* 6/2015 An .................. G06F 16/583
707/756
2016/0307070 A1* 10/2016 Jiang .................... G06V 10/776
(Continued)

FOREIGN PATENT DOCUMENTS

CN 104572971 A 4/2015
CN 106445939 A 2/2017
(Continued)

OTHER PUBLICATIONS

Zongqian Zhan, Gaofeng Zhou, and Zue Yang; A Method of Hierarchical Image Retrieval for Real-Time Photogrammetry Based on Multiple Features, Feb. 4, 2020 (Year: 2020).*
(Continued)

*Primary Examiner* — Khai M Nguyen
(74) *Attorney, Agent, or Firm* — Sughrue Mion, PLLC

(57) ABSTRACT

An image retrieval method is provided. The image retrieval method includes: performing feature extraction on an image according to a deep learning-based feature extraction manner to obtain a first feature; determining, based on the first feature, at least one candidate image; performing feature extraction on the image and each of the at least one candidate image according to a non-deep learning-based extraction manner to obtain a second feature; sequentially performing key point matching processing on the image with each of the at least one candidate image based on the extracted second feature; determining a first image, from among the at least one candidate image, as an image retrieval result, based on a quantity of matched key points (Continued)

between the first image and the image being greater than a quantity threshold; and transmitting the image retrieval result.

20 Claims, 8 Drawing Sheets

(51) Int. Cl.
*G06F 16/55* (2019.01)
*G06V 10/46* (2022.01)
*G06V 10/74* (2022.01)
*G06V 10/75* (2022.01)
*G06V 10/762* (2022.01)
*G06V 10/764* (2022.01)
*G06V 10/774* (2022.01)
*G06V 10/776* (2022.01)
*G06V 10/82* (2022.01)

(52) U.S. Cl.
CPC .......... *G06V 10/462* (2022.01); *G06V 10/761* (2022.01); *G06V 10/762* (2022.01); *G06V 10/764* (2022.01); *G06V 10/774* (2022.01); *G06V 10/776* (2022.01); *G06V 10/82* (2022.01)

(58) Field of Classification Search
CPC .. G06V 10/774; G06V 10/776; G06V 10/764; G06V 16/55; G06V 16/532
See application file for complete search history.

(56) References Cited

U.S. PATENT DOCUMENTS

| | | | |
|---|---|---|---|
| 2021/0042579 A1* | 2/2021 | Chen | G06V 10/82 |
| 2021/0406525 A1* | 12/2021 | Fan | G06F 18/214 |
| 2022/0122292 A1* | 4/2022 | Zhu | G06N 3/04 |
| 2022/0351547 A1* | 11/2022 | Zhou | G06F 3/017 |
| 2022/0398746 A1* | 12/2022 | Fu | G06T 7/579 |

FOREIGN PATENT DOCUMENTS

| | | |
|---|---|---|
| CN | 107368614 A | 11/2017 |
| CN | 109918532 A | 6/2019 |
| CN | 110059807 A | 7/2019 |
| CN | 111339343 A | 6/2020 |
| WO | 2019/238125 A1 | 12/2019 |

OTHER PUBLICATIONS

Claudia Companioni-Brito, et al."Editorial Image Retrieval Using Handcrafted and CNN Features", International Conference, USA, Sep. 2015, XP047477029, pp. 284-291 (8 pages).
Stefan Petscharnig, et al., "Dimensionality Reduction for Image Features using Deep Learning and Autoencoders", Content-Based Multimedia Indexing, Jun. 19, 2017, XP058370453, pp. 1-6 (6 pages).
Sarlin et al., "Leveraging Deep Visual Descriptors for Hierarchical Efficient Localization", 2nd Conference on Robot Learning (CoRL 2018), Sep. 18, 2018, pp. 1-10.
Zhan et al., "A Method of Hierarchical Image Retrieval for Real-Time Photogrammetry Based on Multiple Features", IEEE Access, vol. 8, 2020, pp. 21524-21533.
Communication issued Dec. 17, 2024 in European Application No. 20 918 594.1.
International Search Report for PCT/CN2020/126086 dated, Feb. 3, 2021.
Written Opinion of the International Searching Authority for PCT/CN2020/126086 dated, Feb. 3, 2021.
Translation of Written Opinion of the International Searching Authority dated Feb. 3, 2021 in International Application No. PCT/CN2020/126086.
Extended European Search Report dated Oct. 13, 2022 in European Application No. 20918594.1.
Jing Huang et al., "A Method for Content-Based Image Retrieval with a Two-Stage Feature Matching", 10th International Conference on Intelligent Control and Information Processing, 2019, pp. 213-220 (8 pages total).
Shiuan Huang et al., "Multi-Query Image Retrieval using CNN and SIFT Features", Proceedings of APSIPA Annual Summit and Conference 2017, 2017, pp. 1026-1034 (9 pages total).
Mathilde Caron et al., "Deep Clustering for Unsupervised Learning of Visual Features", arXiv:1807.05520v2, 2019, pp. 1-18 (18 pages total).

* cited by examiner

IMAGE RETRIEVAL METHOD AND APPARATUS, STORAGE MEDIUM, AND DEVICE

CROSS-REFERENCE TO RELATED APPLICATIONS

This application is a bypass continuation application of International Application No. PCT/CN2020/126086, filed on Nov. 3, 2020, which claims priority to Chinese Patent Application No. 202010088101.4, filed with the China National Intellectual Property Administration on Feb. 12, 2020, the disclosures of which are herein incorporated by reference in their entireties.

FIELD

The present disclosure relates to artificial intelligence (AI), and in particular, to an image retrieval method and apparatus, a storage medium, and a device.

BACKGROUND

AI is an emerging science and technology researched and developed currently for simulating, extending, and expanding human intelligence. Image retrieval may retrieve another image similar to or the same as one image from mass images, namely, search by image, where a user is allowed to input an image, to find another similar or same image.

During image retrieval, retrieval efficiency and retrieval precision are crucial and are important indicators for measuring an image retrieval solution. Therefore, how to perform image retrieval to ensure image retrieval efficiency and retrieval precision becomes a problem to be resolved urgently by persons skilled in the art at present.

SUMMARY

Embodiments provide an image retrieval method and apparatus, a storage medium, and a device.

According to an aspect of an embodiment, an image retrieval method is performed by at least one processor of an image retrieval device, and includes: obtaining an image; performing feature extraction on the image according to a first feature extraction manner to obtain a first feature, the first feature extraction manner being a deep learning-based extraction manner; determining, based on the first feature of the image, at least one candidate image matching the image; performing feature extraction on the image and each of the at least one candidate image according to a second feature extraction manner to obtain a second feature, the second feature extraction manner being a non-deep learning-based extraction manner; sequentially performing key point matching processing on the image with each of the at least one candidate image based on the extracted second feature; determining a first image, from among the at least one candidate image, as an image retrieval result, based on a quantity of matched key points between the first image and the image being greater than a quantity threshold; and transmitting the image retrieval result.

The performing feature extraction on the image according to the first feature extraction manner may include performing feature extraction on the image based on a deep learning model, the deep learning model being obtained through training based on a first training dataset and a second training dataset. The first training dataset may be a dataset provided with a label, and the second training dataset may be a dataset that is not provided with a label.

The deep learning model may include a convolutional neural network (CNN), a clustering branch, and a classification branch, and a training process of the deep learning model may include: inputting sample images comprised in the first training dataset and the second training dataset into the CNN; invoking a clustering model of the clustering branch; iteratively clustering feature data outputted by the CNN; outputting an obtained clustering result as a pseudo-label to the classification branch; invoking a classifier of the classification branch; obtaining a loss value based on the pseudo-label; and iteratively updating a weight of the CNN according to the loss value.

The obtaining the loss value based on the pseudo-label may include obtaining the loss value based on the pseudo-label according to the pseudo-label and a classification result of the classifier for the feature data outputted by the CNN.

The image retrieval method may further include: obtaining normalized mutual information (NMI) of clustering results of two adjacent rounds, the NMI indicating stability of the deep learning model, and a larger value of the NMI indicating that the deep learning model is closer to a convergence state; determining the convergence state of the deep learning model according to the NMI; and stopping the training process after the deep learning model reaches the convergence state, a convergence condition of the deep learning model being that the value of the NMI reaches a stable value.

The determining, based on the first feature of the image, the at least one candidate image may include: obtaining feature distances between the first feature of the image and first features stored in a feature database; sorting retrieval images corresponding to the stored first features in descending order of the feature distances; and determining a specified quantity of retrieval images ranked top as the at least one candidate image.

The performing feature extraction on each of the at least one candidate image may include: obtaining a first feature of each of the at least one candidate image; obtaining a feature distance between the first feature of each of the at least one candidate image and the first feature of the image; and performing second feature extraction on a second image in the at least one candidate image. A feature distance between the second image and the image may be less than a first distance threshold.

The obtaining the image may include: receiving an image retrieval request transmitted by a terminal; and obtaining the image from the image retrieval request. The image retrieval method may further include, after obtaining the image retrieval result, transmitting the image retrieval result to the terminal.

The performing feature extraction on the image and each of the at least one candidate image according to the second feature extraction manner may include: performing, for any image on which feature extraction is to be performed, key point detection on the image, to obtain a plurality of key points; and establishing a descriptor for each detected key point separately, the descriptor being represented by using a feature vector of a fixed dimension.

The performing key point matching processing on the image with each of the at least one candidate image sequentially based on the extracted second feature may include: obtaining a first key point descriptor set of the image and a second key point descriptor set of any candidate image; determining a feature distance between any a first key point descriptor and a second key point descriptor, the first key point descriptor being from the first key point descriptor set, and the second key point descriptor being from the second key point descriptor set; determining matched key points in the image and the candidate image based on the obtained feature distance, a feature distance corresponding to any pair of matched key points being less than a second distance threshold; and filtering the matched key points to obtain final matched key points.

The second feature may be a scale-invariant feature transform (SIFT) feature.

According to an aspect of an embodiment, an image retrieval device includes: at least one memory configured to store program code; and at least one processor configured to read the program code and operate as instructed by the program code, the program code including: first obtaining code configured to cause at least one of the at least one processor to obtain an image; first performing code configured to cause at least one of the at least one processor to perform feature extraction on the image according to a first feature extraction manner to obtain a first feature, the first feature extraction manner being a deep learning-based extraction manner; first determining code configured to cause at least one of the at least one processor to determine, based on the first feature of the image, at least one candidate image matching the image; second performing code configured to cause at least one of the at least one processor to perform feature extraction on the image and each of the at least one candidate image according to a second feature extraction manner to obtain a second feature, the second feature extraction manner being a non-deep learning-based extraction manner; third performing code configured to cause at least one of the at least one processor to sequentially perform key point matching processing on the image with each of the at least one candidate image based on the extracted second feature; second determining code configured to cause at least one of the at least one processor to determine a first image, from among the at least one candidate image, as an image retrieval result based on a quantity of matched key points between the first image and the image being greater than a quantity threshold; and transmitting code configured to cause at least one of the at least one processor to transmit the image retrieval result.

The first performing code may be further configured to cause at least one of the at least one processor to perform feature extraction on the image based on a deep learning model, the deep learning model being obtained through training based on a first training dataset and a second training dataset, the first training dataset may be a dataset provided with a label, and the second training dataset may be a dataset not provided with a label.

The deep learning model may include a CNN, a clustering branch, and a classification branch, and the program code may further include training code configured to cause at least one of the at least one processor to perform a training process of the deep learning model, the training process including: inputting sample images comprised in the first training dataset and the second training dataset into the CNN; invoking a clustering model of the clustering branch; iteratively clustering feature data outputted by the CNN; outputting an obtained clustering result as a pseudo-label to the classification branch; invoking a classifier of the classification branch; obtaining a loss value based on the pseudo-label; and iteratively updating a weight of the CNN according to the loss value.

The obtaining the loss value based on the pseudo-label may include: obtaining the loss value based on the pseudo-label according to the pseudo-label and a classification result of the classifier for the feature data outputted by the CNN.

The program code may further include: second obtaining code configured to cause at least one of the at least one processor to obtain normalized mutual information (NMI) of clustering results of two adjacent rounds, the NMI indicating stability of the deep learning model, and a larger value of the NMI indicating that the deep learning model is closer to a convergence state; determining code configured to cause at least one of the at least one processor to determine the convergence state of the deep learning model according to the NMI; and stopping code configured to cause at least one of the at least one processor to stop the training process after the deep learning model reaches the convergence state, a convergence condition of the deep learning model being that the value of the NMI reaches a stable value.

The first determining code may be further configured to cause at least one of the at least one processor to: obtain feature distances between the first feature of the image and first features stored in a feature database; sort retrieval images corresponding to the stored first features in descending order of the feature distances; and determine a specified quantity of retrieval images ranked top as the at least one candidate image.

The first performing code may be further configured to cause at least one of the at least one processor to: obtain a first feature of each candidate image; obtain a feature distance between the first feature of each of the at least one candidate image and the first feature of the image; and perform second feature extraction on a second image in the at least one candidate image. A feature distance between the second image and the image may be less than a first distance threshold.

The obtaining code may be further configured to cause at least one of the at least one processor to receive an image retrieval request transmitted by a terminal and obtain the image from the image retrieval request, and the transmitting code may be further configured to cause at least one of the at least one processor to transmit the image retrieval result to the terminal.

According to an aspect of an embodiment, a non-transitory computer readable storage medium, stores at least one instruction executable by at least one processor to perform an image retrieval method including: obtaining an image; performing feature extraction on the image according to a first feature extraction manner to obtain a first feature, the first feature extraction manner being a deep learning-based extraction manner; determining, based on the first feature of the image, at least one candidate image matching the image; performing feature extraction on the image and each of the at least one candidate image according to a second feature extraction manner to obtain a second feature, the second feature extraction manner being a non-deep learning-based extraction manner; sequentially performing key point matching processing on the image with each of the at least one candidate image based on the extracted second feature; determining a first image, from among the at least one candidate image, as an image retrieval result, based on a quantity of matched key points between the first image and the image being greater than a quantity threshold; and transmitting the image retrieval result.

BRIEF DESCRIPTION OF THE DRAWINGS

The above and other aspects will be more apparent from the following description of embodiments taken in conjunction with the accompanying drawings, in which.

DESCRIPTION OF EMBODIMENTS

Figure 1:
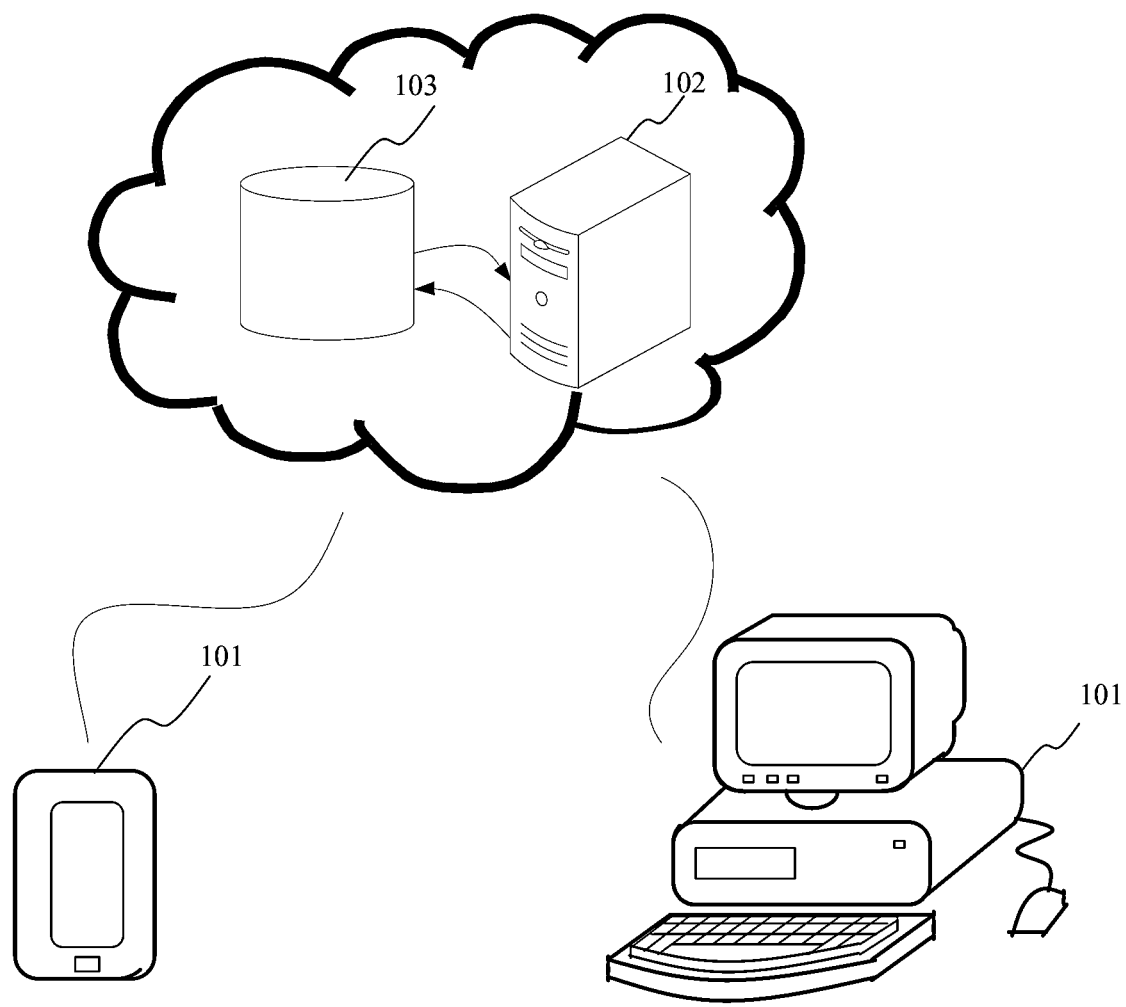
FIG. 1 is a schematic diagram of an implementation environment involved in an image retrieval method according to an embodiment.

Embodiments will not be described more fully with reference to the accompanying drawings.

AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that may react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies, and attempts to establish an AI system that may obtain information from images or multi-dimensional data.

The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Machine learning (ML) is a multi-disciplinary subject involving a plurality of disciplines such as probability theory, statistics, approximation theory, convex analysis, and algorithm complexity theory. The ML specializes in studying how a computer simulates or implements a human learning behavior to obtain new knowledge or skills, and reorganize an existing knowledge structure, so as to keep improving its performance. The ML is the core of AI, is a basic way to make the computer intelligent, and is applied to various fields of AI.

The ML and deep learning generally include technologies such as an artificial neural network, a belief network, reinforcement learning, transfer learning, inductive learning, and learning from demonstrations. The deep learning is a new research direction in the field of ML.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided by embodiments of this disclosure involve technologies such as image retrieval and deep learning of AI. That is, the solutions provided in the embodiments of this disclosure may be applied to an image retrieval scenario, for example, may be applied to an image homologous similarity matching scenario, which may be described below by using the following embodiments.

First, some terms or abbreviations described herein are explained.

Supervised learning: a network training method whose training data includes labels. Through training according to the training data, a machine may independently find a relationship between features and labels, so that when facing data only including features and without labels, the machine may determine the labels. That is, supervised learning is a method for training a network by using training data with known labels.

Unsupervised learning: a network training method whose labels of training data are unknown. A training target is to disclose intrinsic properties and principles of data based on learning of training data without labels, to provide foundation for further data analysis.

That is, unsupervised learning is suitable for training data without labels. Among this type of learning tasks, clustering is most-studied and most-widely used.

Semi-supervised learning: using some sample data with labels and some sample data without labels to train a model in ML.

In other words, for semi-supervised learning, the training data both includes sample data with labels and sample data that is not marked, so that without manual intervention, a machine may automatically use the sample data that is not marked to improve learning performance without depending on external interaction.

Generally, semi-supervised learning combines a large amount of sample data that is not marked and a small amount of sample data with labels in a training stage.

Compared with a model that performs training using sample data all with labels, a model obtained through training using a large amount of sample data that is not marked and a small amount of sample data with labels is more accurate and has lower training costs.

Clustering: a process of dividing samples included in a dataset into a plurality of subsets that generally do not intersect with each other, and each subset is referred to as a cluster.

Deep clustering: a clustering method integrating learning a neural network parameter and obtaining feature cluster distribution. That is, deep clustering is to combine deep learning with clustering, and compared with conventional clustering methods, the deep clustering method is relatively simple, a network structure is easy to understand, and a clustering effect is also better than most conventional clustering methods.

Deep learning: this concept is derived from research on artificial neural network. For example, a multi-layer sensor including a plurality of hidden layers is a deep learning structure. Deep learning forms a more abstract high-level feature by combining low-level features, so as to discover distributed feature representation of data.

In other words, deep learning is a method based on performing representation learning on data. An observed value (for example, an image) may be represented by using a plurality of methods. For example, the image may be represented by using a vector of an intensity value of each pixel in the image, or the image may be represented as a series of edges or a region in a specific shape in a more abstract manner. Take-based learning such as face recognition or facial expression recognition may be more easily performed from examples by using some specific representation methods. Deep learning uses non-supervised or supervised feature learning and a layered feature extraction efficient algorithm to replace manual feature obtaining, thereby having higher efficiency.

Convolutional neural network (CNN): one of representative algorithms of deep learning, and is a feedforward neural network that contains convolution calculation and has a deep structure.

Deep feature: a feature extracted based on deep learning. In the embodiments of this disclosure, a deep feature refers to an intermediate feature vector outputted by a high-level hidden layer of a neural network (such as the CNN).

The deep feature is also referred to as a first feature in this specification. That is, the first feature is a feature extracted according to a first feature extraction manner, and the first feature extraction manner is a deep learning-based extraction manner.

Manual feature: a feature extracted based on non-deep learning, namely, a feature extracted based on a manually designed feature extraction manner.

The manual feature is also referred to as a second feature in this specification. That is, the second feature is a feature extracted according to a second feature extraction manner, and the second feature extraction manner is a non-deep learning-based extraction manner.

SIFT feature: SIFT is used for a description in the field of image processing. This description includes scale invariance, which may detect key points from an image, and is a local feature description.

The SIFT feature is a local feature of an image, which has good invariance for translation, rotation, scale zooming, brightness change, blocking, and noise, and may also ensure a certain degree of stability for visual change and affine transformation. That is, the SIFT feature not only includes scale invariance, but also may obtain a good detection effect even a rotation angle, image brightness, or a photographing perspective is changed, which is a very stable local feature.

Homologous similar: in the embodiments of this disclosure, homologous similar refers to that content of two images are exactly the same, or a degree of similarity between minor changes such as a photographing perspective, image capturing, stretching, and remaking.

In this disclosure, an execution entity of operations, namely, an image retrieval device may be a computer device. The computer device may be any electronic device including processing and storage capabilities, such as a mobile phone, a tablet computer, a game device, a multimedia playback device, an electronic photo frame, a wearable device, a personal computer (PC), or an on-board computer, or may be a server. Exemplary examples for ease of description in the following method embodiments do not constitute a limitation to this disclosure.

An implementation environment involved in the image retrieval method provided in this embodiment of this disclosure is described below in detail.

For example, referring to FIG. 1, the implementation environment may include one or more terminals 101, an image retrieval device 102, and a feature database 103.

For example, the image retrieval device 102 may be a server, and the image retrieval device 102 and the feature database 103 may be configured on the same server or may be configured on different servers, which is not specifically limited in the embodiments of this disclosure. In an example, the terminal 101 and the image retrieval device 102 may perform Internet communication by using a client/server mode. In addition, one server may be configured to be accessed by a plurality of clients.

In this embodiment, a type of the terminal 101 includes, but is not limited to, a mobile terminal and a fixed terminal. In an example, the mobile terminal includes, but is not limited to, a smartphone, a tablet computer, a notebook computer, an e-reader, a moving picture experts group audio layer III (MP3) player, or a moving picture experts group audio layer IV (MP4) player; and the fixed terminal includes, but is not limited to, a desktop computer.

Based on the foregoing implementation environment, after obtaining an image, the terminal 101 may upload the image to the image retrieval device 102, and the image retrieval device 102 performs the image retrieval method provided in this embodiment. The image retrieval method provided in this embodiment adopts two layers of algorithm logic shown in FIG. 2, which are respectively a first layer of algorithm logic 201 and a second layer of algorithm logic 202. In an exemplary application scenario, this embodiment may perform homologous similarity matching of images based on the two-layer structure solution.

In this embodiment, depth feature quality of an image is ensured through semi-supervised learning, and possible matched objects may be screened out from the feature database 103 based on feature distance comparison of depth features of images in the first layer of algorithm logic 201. Then, whether further verification needs to be performed by using the second layer pf algorithm logic 202 is determined according to a threshold. The second layer of algorithm logic is used for retrieving a final matched object from the screened possible matched objects based on a similarity matching solution of manual features of images, to ensure the retrieval precision and retrieval efficiency.

That is, in this embodiment, the depth feature quality of the image is ensured through semi-supervised learning, image recall is ensured by using the first layer of algorithm logic 201, and a calculation magnitude of similarity matching performed by the second layer of algorithm logic 202 based on the manual feature is reduced through threshold control and an image candidate mechanism, so that the usability of the image retrieval method may be greatly improved while ensuring the image recall rate and the retrieval precision, thereby shortening an image retrieval time and ensuring the retrieval efficiency.

The image retrieval method provided in this embodiment is described below in detail with reference to the following embodiments.

Figure 3:
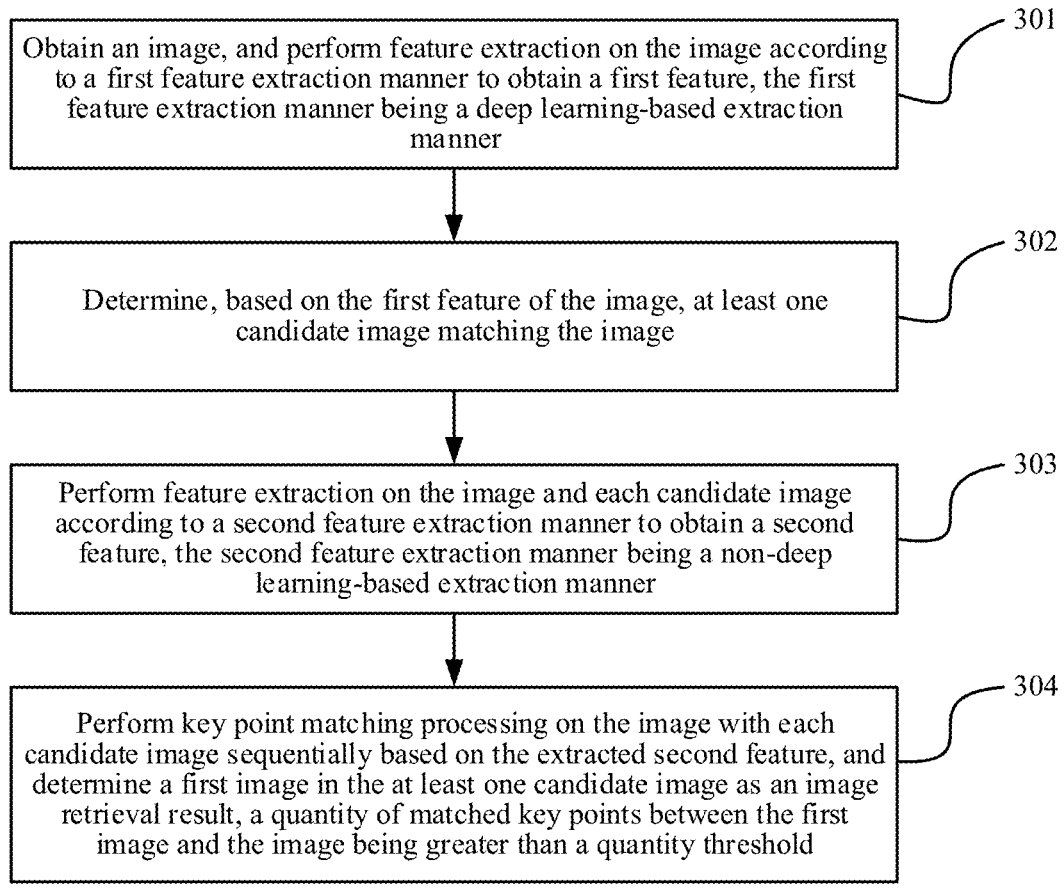
FIG. 3 is a flowchart of an image retrieval method according to an embodiment.

FIG. 3 is a flowchart of an image retrieval method according to an embodiment. An execution entity of the method is the image retrieval device 102 shown in FIG. 1. Referring to FIG. 3, a procedure of the method provided in this embodiment includes:

301: Obtaining an image, and performing feature extraction on the image according to a first feature extraction manner to obtain a first feature, the first feature extraction manner being a deep learning-based extraction manner.

In this specification, the first feature refers to a depth feature extracted based on the deep learning-based extraction manner.

In a possible implementation, the image retrieval device obtaining an image includes, but is not limited to: receiving an image retrieval request transmitted by a terminal, and obtaining the image from the image retrieval request. That is, the image retrieval device may perform image retrieval in response to the image retrieval request transmitted by the terminal. For example, the terminal may transmit an image retrieval request to the image retrieval device by using a POST method, which is not specifically limited in the embodiments of this application.

Generally, before the image retrieval device performs image retrieval, this embodiment further includes a process of constructing a feature database. In this embodiment, the feature database stores depth features of mass images. The mass images may be collected in advance. In this specification, the mass images that is collected in advance are also referred to as retrieval images. Correspondingly, after the feature database is constructed, the image retrieval device may process image retrieval requests initiated by terminals based on the feature database.

First, for a process of performing depth feature extraction on the retrieval images, reference may be made to the description of a process of performing depth feature extraction on the image in the following context.

In this embodiment, depth feature extraction may be performed on the image based on a deep learning model, where the deep learning model is obtained through training based on a first training dataset and a second training dataset, the first training dataset is a dataset provided with a label, and the second training dataset is a dataset not provided with a label. That is, to ensure the depth feature quality of the image, in this embodiment, a semi-supervised learning method is used, and some sample data with labels and some sample data without labels are used to train a model.

In other words, for semi-supervised learning, the training data both includes sample data with labels and sample data that is not marked. For example, semi-supervised learning combines a large amount of sample data that is not marked and a small amount of sample data with labels in a training stage. That is, a quantity of samples included in the first training dataset is less than a quantity of samples included in the second training dataset. The first training dataset may be an ImageNet dataset, which is not specifically limited in the embodiments of this application.

Second, for a specific training process of the deep learning model, reference may be made to the following context.

302: Determining, based on the first feature of the image, at least one candidate image matching the image.

In this embodiment, the at least one candidate image may include one candidate image or may include a plurality of candidate images.

Figure 2:
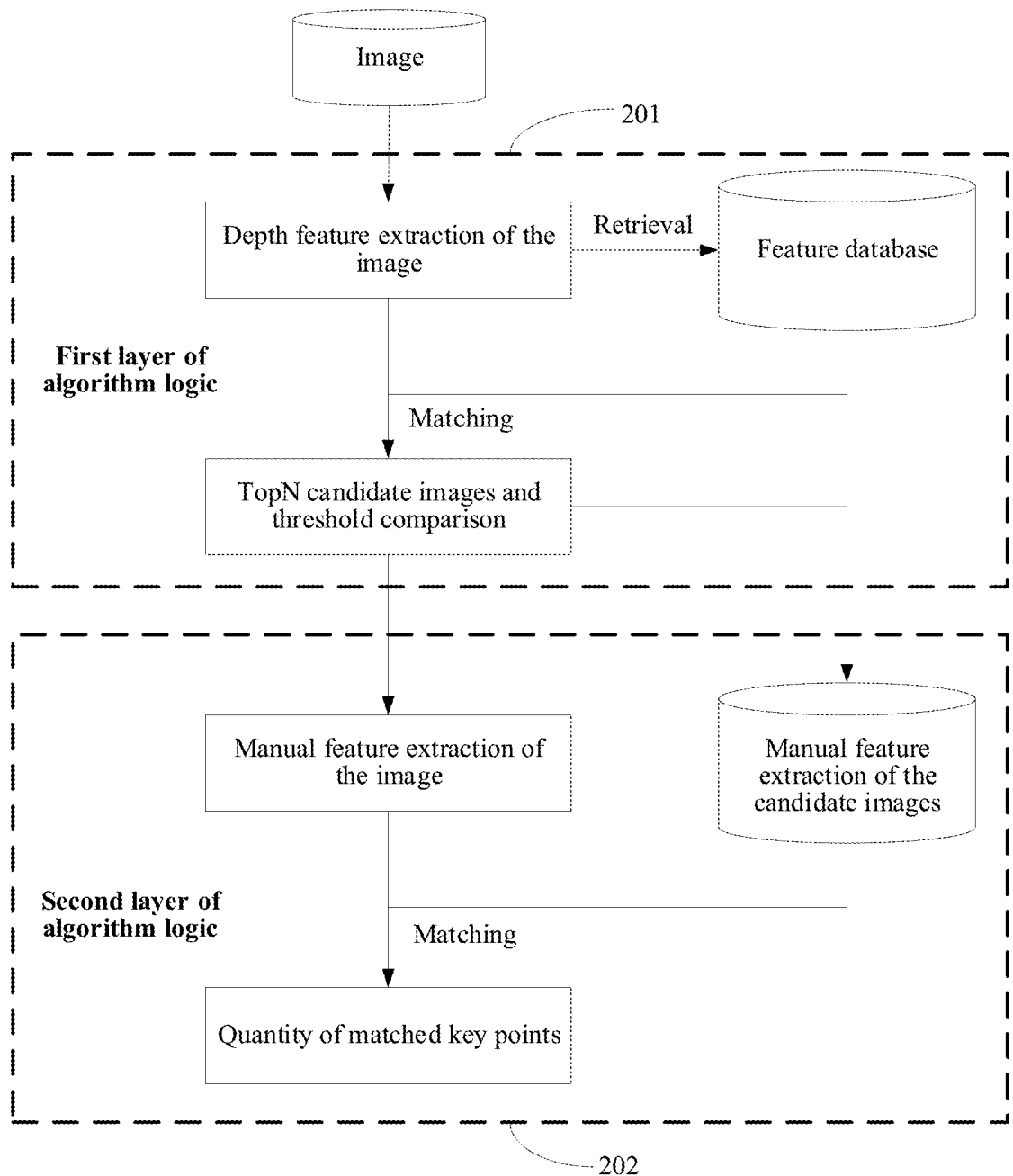
FIG. 2 is a schematic diagram of performing image retrieval based on two layers of algorithm logic according to an embodiment.

As shown by the first layer of algorithm logic 201 in FIG. 2, after extracting the depth feature of the image, the image retrieval device may perform image matching in the feature database, to screen out possible matched objects. The determining, based on the first feature of the image, at least one candidate image matching the image includes, but is not limited to: obtaining feature distances between the depth feature of the image and depth features stored in the feature database, and sorting retrieval images corresponding to the stored depth features in descending order of the feature distances; and determining a specified quantity of retrieval images ranked top as the at least one candidate image.

As can be known based on the foregoing description, in this embodiment, the feature distances between the depth feature of the image and the depth features stored in the feature database may be calculated, to further screen out TopN candidate images as possible matched objects by using the feature distances. That is, the at least one candidate image matching the image is determined by using a TopN method. The specified quantity, namely, a value of N may be set in advance, and the value of N may be a positive integer, for example, may be 5, 10, or 15, which is not specifically limited in the embodiments of this application. For example, the feature distance may be a Euclidean distance.

In addition, for any screened candidate image, if a feature distance between the image and the candidate image is less than a first distance threshold, for example, a Euclidean distance between the two parties is less than a set threshold α, the candidate image is outputted to the second layer of algorithm logic 202 for processing. For a detailed description, reference may be made to the following operation 303.

303: Performing feature extraction on the image and each candidate image according to a second feature extraction manner to obtain a second feature, the second feature extraction manner being a non-deep learning-based extraction manner.

In this specification, the second feature refers to a manual feature extracted based on the non-deep learning-based extraction manner.

This operation corresponds to the second layer of algorithm logic 202 in FIG. 2. As described in operation 302, in this operation, the candidate image on which manual feature extraction is performed is a candidate image whose feature distance with the image is less than the first distance threshold. If the feature distances between the TopN candidate images and the image are all less than the first distance threshold, manual feature extraction is performed on all the TopN candidate images in this operation.

That is, performing manual feature extraction on the at least one candidate image further includes: performing manual feature extraction on a second image in the at least one candidate image, where a feature distance between the second image and the image is less than the first distance threshold. In a possible implementation, the manual feature includes, but is not limited to, a scale-invariant feature transform (SIFT) feature, a speeded up robust feature (SURF) feature, and an oriented fast and rotated brief (ORB) feature, which is not specifically limited in the embodiments of this application.

304: Performing key point matching processing on the image with each candidate image sequentially based on the extracted second feature; and determining a first image in the at least one candidate image as an image retrieval result, a quantity of matched key points between the first image and the image being greater than a quantity threshold.

As shown in FIG. 2, after respectively extracting the manual feature of the image and the manual feature of each candidate images inputted into the second layer of algorithm logic 202, the second layer of algorithm logic 202 may calculate a quantity of matched key points between the image and each candidate image sequentially.

In one example, if the quantity of matched key points between the image and one candidate image is greater than a set threshold β, it is determined that image retrieval succeeds, and a subsequent retrieval process is stopped. That is, the image retrieval result may only include one retrieval image that is homologous similar to the image.

In another example, the image retrieval result may further include a plurality of retrieval images that are homologous similar to the image. That is, if the quantities of matched key points between the image and the plurality of candidate images all exceed the set threshold β, the candidate images are all used as the image retrieval result.

According to the method provided in this embodiment, the depth feature and the manual feature are combined to perform image retrieval, so that advantages of the two features are integrated, where performing image retrieval based on the depth feature has relatively low calculation costs, and performing image retrieval based on the manual feature has advantages in the aspect of retrieval precision. This embodiment includes two layers of algorithm logic. The first layer of algorithm logic may extract a depth feature and performs image screening based on the extracted depth feature, and only inputs candidate images obtained through screening into the second layer of algorithm logic for manual feature extraction, which greatly reduces a calculation amount of performing image matching based on the manual feature by the second layer of algorithm logic, and ensures the retrieval efficiency, and image matching is performed again based on the manual feature after images are screened based on the depth feature, so that the retrieval precision is ensured. In addition, the first layer of algorithm logic uses a semi-supervised learning method, so that the depth feature quality may be further greatly improved. That is, in this embodiment, the image retrieval precision is effectively improved while ensuring the retrieval efficiency.

In an embodiment, the method further includes a training process of a deep learning model in the first layer of algorithm logic.

Figure 4:
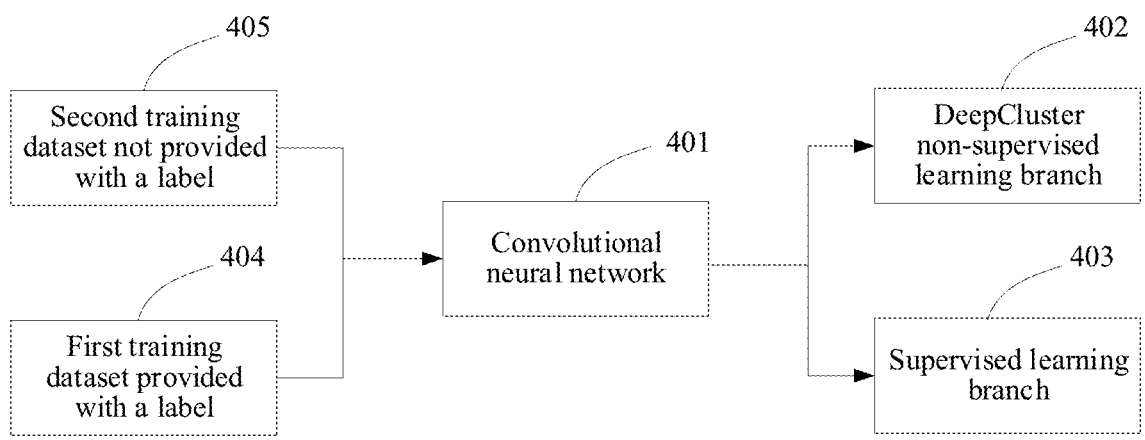
FIG. 4 is a schematic structural diagram of a deep learning model according to an embodiment.

For example, FIG. 4 shows a structure of the deep learning model. As shown in FIG. 4, the deep learning model includes a convolutional neural network (CNN) 401, a clustering branch (non-supervised learning branch) 402, and a classification branch (supervised learning branch) 403. The first training dataset 404 and the second training dataset may all be inputted into the CNN 401 for depth feature extraction.

Figure 5:
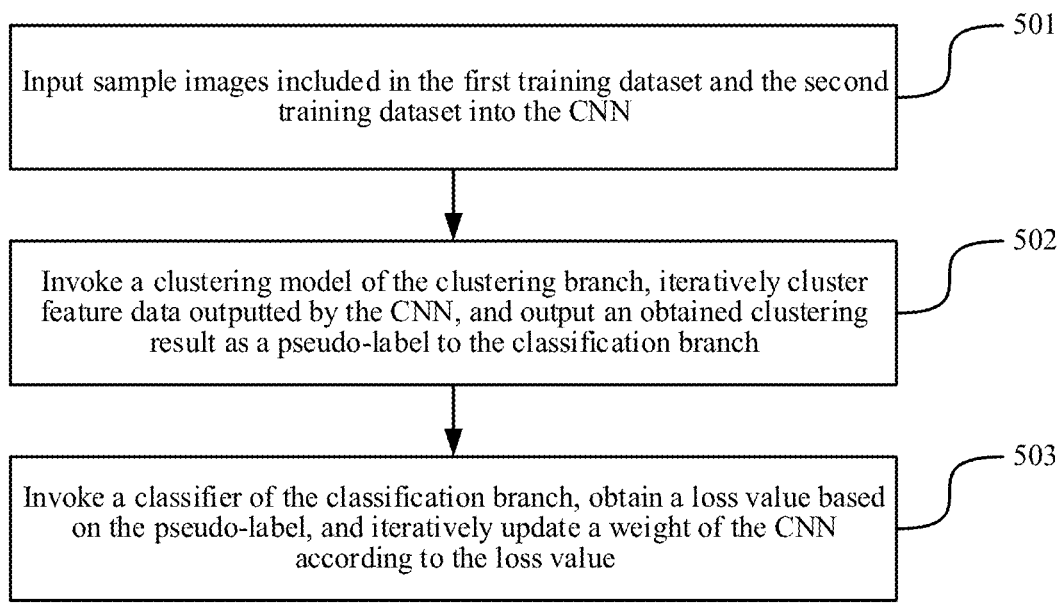
FIG. 5 is a flowchart of a training method of a structure of a deep learning model according to an embodiment.

The training process of the deep learning model may also be performed on the image retrieval device, or may be performed on another device and then transmitted by the another device to the image retrieval device. Referring to FIG. 5, the training process of the deep learning model includes, but is not limited to, the following operations:

501: Inputting sample images included in the first training dataset and the second training dataset into the CNN.

As shown in FIG. 4, the sample images included in the first training dataset 404 and the second training dataset 405 may all be inputted into the CNN 401 for depth feature extraction. That is, this embodiment uses a semi-supervised learning method to ensure the depth feature quality. For example, semi-supervised learning combines a large amount of sample images that are not marked and a small amount of sample images with labels in a training stage. That is, a quantity of sample images included in the first training dataset is less than a quantity of sample images included in the second training dataset.

Figure 6:
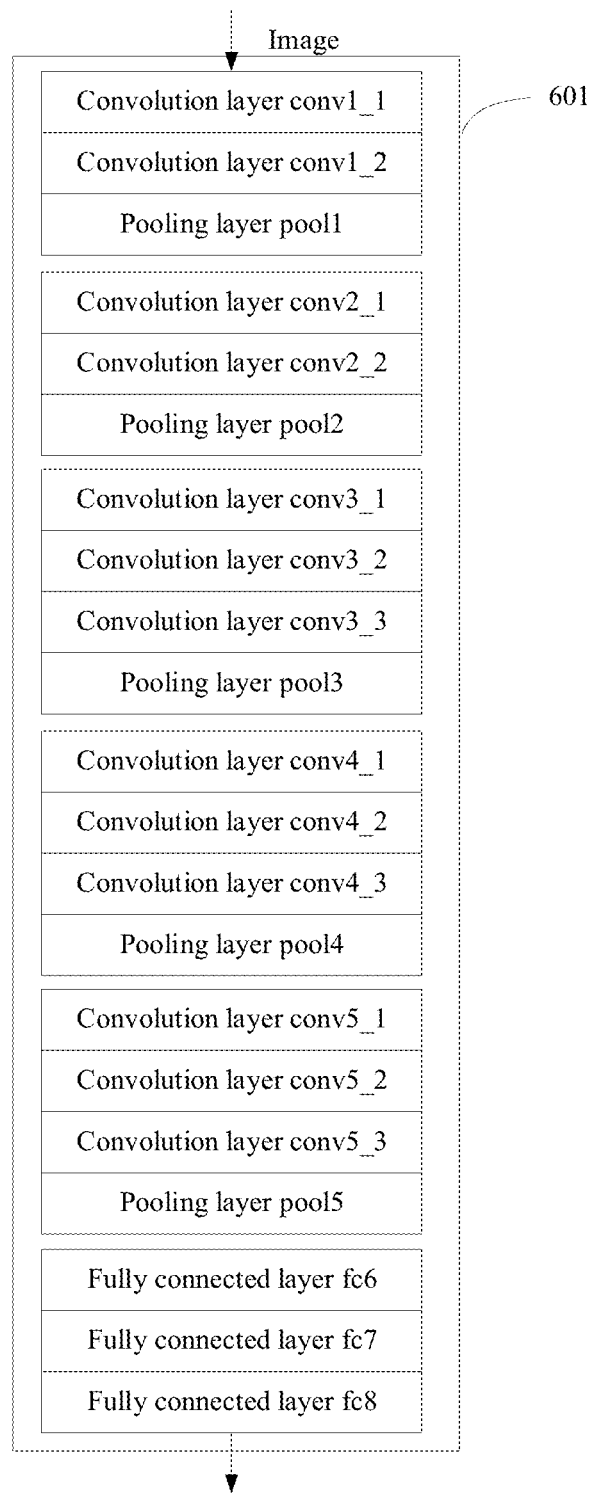
FIG. 6 is a schematic structural diagram of a convolutional neural network according to an embodiment.

In a possible implementation, the CNN 401 may be an AlexNet or a VGG16, which is not specifically limited in the embodiments of this application. FIG. 6 shows a possible structure 601 of the VGG16. As shown in FIG. 6, convolution layers and pooling layers of the VGG16 may be divided into different blocks, which are numbered Block1 to Block5 sequentially from front to back. Each block includes a plurality of convolution layers and one pooling layer. In FIG. 6, Block1 and Block2 both include two convolution layers, and Block3 to Block5 all include three convolution layers. In addition, quantities of channels of convolution layers in the same block are generally the same.

502: Invoking a clustering model of the clustering branch, iteratively clustering feature data outputted by the CNN, and outputting an obtained clustering result as a pseudo-label to the classification branch.

In this embodiment, the deep learning model in the first layer of algorithm logic is trained by using a DeepCluster non-supervised learning algorithm in combination with data fitting of the supervised learning-based ImageNet. A non-supervised learning process is constrained by using labelled data, to ensure feature usability while fitting non-labelled data, where a model training method may use multi-task learning, and this is not specifically limited in the embodiments of this application.

That is, the deep learning model combines two tasks: clustering and classification, the two tasks use the same CNN and share a network parameter of the CNN, and the clustering result obtained by using the clustering branch 402 is used as a pseudo-label and provided to a classifier of the classification branch 403 for classification training, to train the network parameter of the CNN. This mutual learning method is beneficial to mutual promotion of the two tasks, thereby achieving better effects separately.

Figure 7:
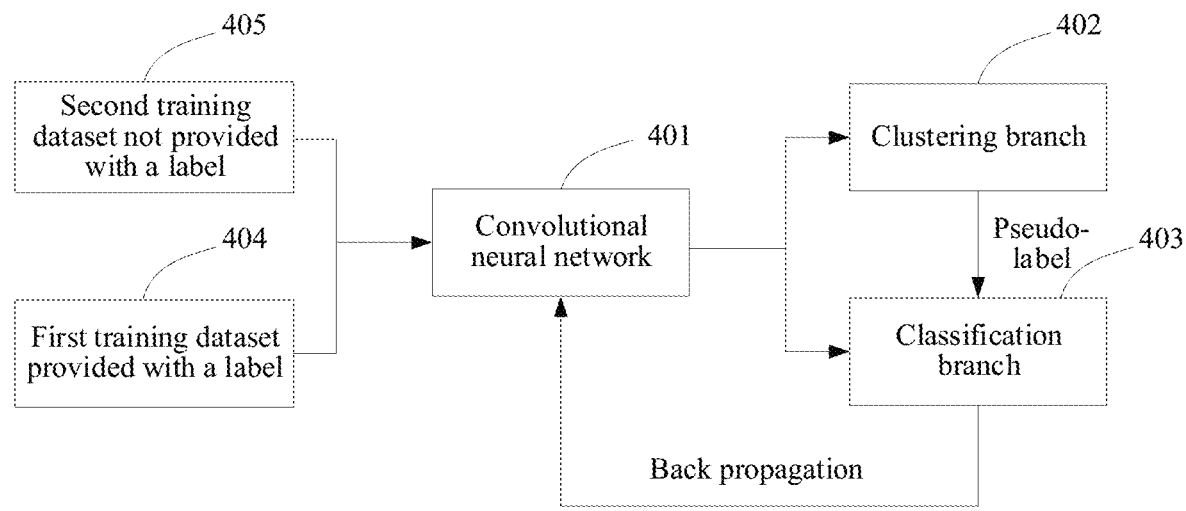
FIG. 7 is a schematic diagram of training a deep learning model according to an embodiment.

As shown in FIG. 7, the sample images included in the first training dataset 404 and the second training dataset 405 are inputted into the CNN 401 of the deep learning model. An output of the CNN 401 is divided into two branches, where one is the clustering branch 402, and one is the classification branch 403. Feature data outputted by the CNN 401 may be inputted into a clustering model of the clustering branch 402 for clustering. For example, the clustering model may use a common K-means algorithm. The classification branch 403 includes a classifier. The two branches share the network parameter of the CNN, the clustering result is provided as a pseudo-label to the classifier for training, and the network parameter of the CNN are optimized by performing back propagation through classification training.

Based on the above, a core idea of the DeepCluster is to iteratively generate a pseudo-label by using the clustering branch 402, and provide the pseudo-label to the classification branch 403 for performing classification training iteratively, to update the network parameter of the CNN.

The two processes are sequentially performed repeatedly. That is, the foregoing training process is an iteration process of extracting feature data, feature data clustering, training the classification task by using a pseudo-label obtained through clustering, updating a network parameter, and extracting feature data again by using the CNN.

503: Invoking a classifier of the classification branch, obtaining a loss value based on the pseudo-label, and iteratively updating a weight of the CNN according to the loss value.

In this embodiment, update of the network parameter, namely, the classification training is performed by using the classification branch, so that a network loss may be a classification loss. That is, in this embodiment, the network parameter is updated according to a loss value of the pseudo-label. The network parameter in this specification may be also referred to as a weight of the CNN.

In a possible implementation, the obtaining a loss value based on the pseudo-label includes, but is not limited to, obtaining the loss value based on the pseudo-label according to the pseudo-label and a classification result of the classifier for the feature data outputted by the CNN.

For example, the loss value based on the pseudo-label may be expressed by using the following formula:

$$\min_{\theta, W} \frac{1}{N} \sum_{n=1}^{N} l(gw(f_\theta(x_n)), y_n)$$

$f_\theta(x_n)$ represents feature mapping performed by the CNN under a network parameter $\theta$ on an input x; gw(.) represents a result of classification performed by the classifier on the features; $l(\cdot, y)$ represents a multinomial logic loss and is generally used for a one-to-many classification task, namely, a softmax loss; $y_n$ represents a cluster to which a sample n belongs, where $y_n$ may be a k-dimensional vector formed by 0 and 1, and if it is assumed that the sample n belongs to a 0th cluster, $y_n$=[1, 0, 0, 0, . . . , 0]; and k is a quantity of cluster centers, and N is a quantity of samples.

In a training iteration process, in each round, the stability of the deep learning model is determined by using normalized mutual information (NMI) of the clustering result, higher NMI indicates that distribution of clustering results of two adjacent rounds is more consistent, and the deep learning model is closer to a convergence state. That is, the method provided in this embodiment further includes: obtaining NMI of clustering results of two adjacent rounds, the NMI indicating the stability of the deep learning model, and a larger value of the NMI indicating that the deep learning model is closer to a convergence state; and determining the convergence state of the deep learning model according to the NMI, and stopping the model training process after the deep learning model reaches the convergence state, a convergence condition of the deep learning model being that the value of the NMI reaches a stable value.

For example, the NMI may be expressed by using the following formula:

$$NMI(A; B) = \frac{I(A; B)}{\sqrt{H(A)H(B)}}$$

A and B represent the clustering results of two adjacent rounds, I is a mutual information calculation formula, and H is an entropy calculation formula. For example, a value range of the NMI is [0, 1].

In an example, a value of the stable value may be 0.8. For example, if the value of the NMI no longer rises after reaching 0.8, the deep learning model reaches the convergence state in this case.

In this embodiment, the deep learning model is trained by using a deep clustering-based model training method, so that when depth feature extraction is performed based on a trained deep learning model, the depth feature quality of retrieval precision may be ensured, and an image recall rate is also ensured, thereby effectively ensuring a coverage capability of the image retrieval method.

In an embodiment, a description is made on the foregoing operations 303 and 304 by using an example in which the manual feature is an SIFT feature.

Extraction of the SIFT feature is generally divided into the following several operations:

a. Extracting key points.

For example, several key points in the image may be detected by establishing a difference of Gaussian (DOG) function, which is not specifically limited in the embodiments of this application.

b. Adding detailed information (a local feature), namely, a descriptor, to each key point.

Each key point includes three pieces of information: a position, a scale, and a direction. Next, a descriptor is established for each detected key point, namely, a group of vectors are used to describe each key point, to make the key point not to change along with various changes such as illumination changes and perspective changes. In addition, the descriptor is to have relatively high uniqueness, for ease of improving a probability of correct feature point matching.

The extracting key points and the adding detailed information to each key point may be referred to as SIFT feature generation, namely, extracting feature vectors irrelevant to scale zooming, rotation, and brightness changes from the image.

For example, a 64-dimensional or 128-dimensional SIFT feature may be extracted for each key point, which is not specifically limited in the embodiments of this application. For example, in an actual application process, to enhance the matching stability, 4×4, namely, 16 seed points in total may be used to describe each key point, and each seed point includes vector information of 8 directions, so that one key point may generate a 128-dimensional SIFT feature vector.

The foregoing operations a and b correspond to the foregoing operation 303, namely, both performing SIFT feature extraction on the image and each candidate image may use the foregoing method. That is, for example, the performing feature extraction on the image and each candidate image according to a second feature extraction manner includes, but is not limited to, performing, for any image on which SIFT feature extraction is to be performed, key point detection on the image, to obtain a plurality of key points; and establishing a descriptor for each detected key point separately, the descriptor being represented by using a feature vector of a fixed dimension.

c. Determining several pairs of key points mutually matching with each other through one-to-one comparison of key points (generally key points with feature vectors) of the two parties, namely, establishing a correspondence between scenery in the image.

In a possible implementation, random sample consensus (RANSAC) verification may be performed on the matched key points, to eliminate stray key point pairs, so as to determine a quantity of final matched key points, and if the quantity of the matched key points is greater than a set quantity threshold, it is determined that matching succeeds.

Figure 8:
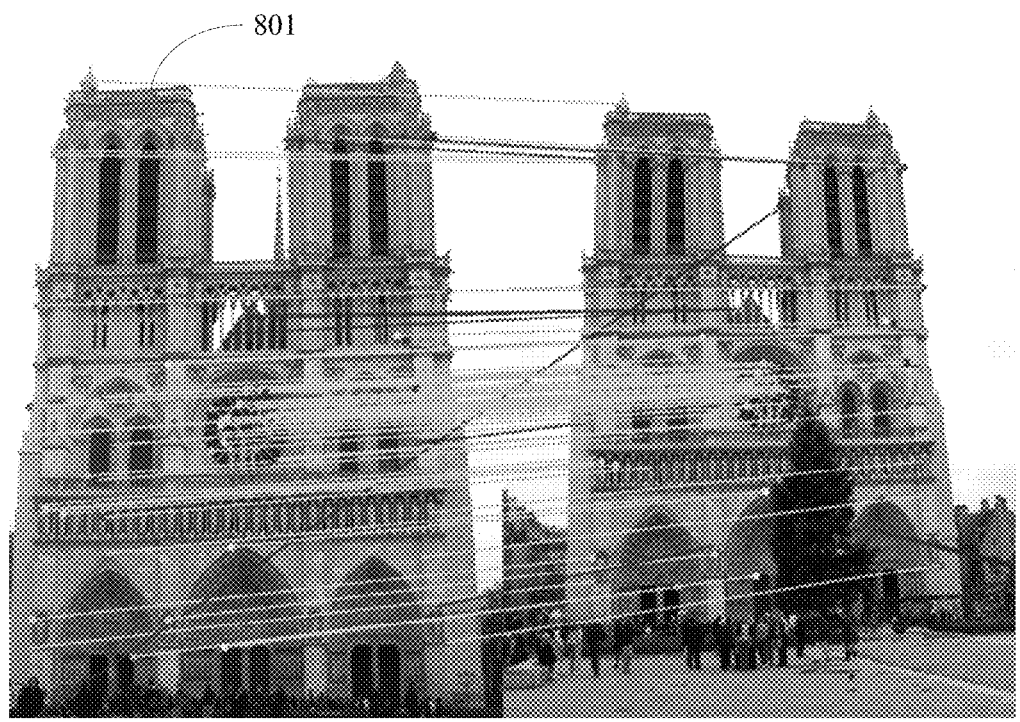
FIG. 8 is a schematic diagram of performing key point matching according to an embodiment.

FIG. 8 shows a diagram of key point matching performed on a building 801. As can be seen from FIG. 8, the quantity of key points involved in key point matching is large.

This operation corresponds to the foregoing operation 304, namely, performing key point matching processing on the image with each candidate image sequentially, which may be performed with reference to this operation. For example, the performing key point matching processing on the image with each candidate image sequentially based on the extracted second feature includes, but is not limited to:

obtaining a first key point descriptor set of the image and a second key point descriptor set of any candidate image, the two sets including key point descriptors; determining a feature distance between any two key point descriptors, one of the any two key point descriptors being from the first key point descriptor set, and the other key point descriptor being from the second key point descriptor set; determining matched key points in the image and the candidate image based on the obtained feature distance, a feature distance corresponding to any pair of matched key points being less than a second distance threshold; and filtering the matched key points to obtain final matched key points.

For example, the feature distance between key point descriptors may be a Euclidean distance, which is not specifically limited in the embodiments of this application.

In this embodiment, the image retrieval precision may be ensured by SIFT feature-based similarity matching.

A detailed execution procedure of the image retrieval method provided in this embodiment is described with reference to the implementation environment shown in FIG. 1.

Figure 9:
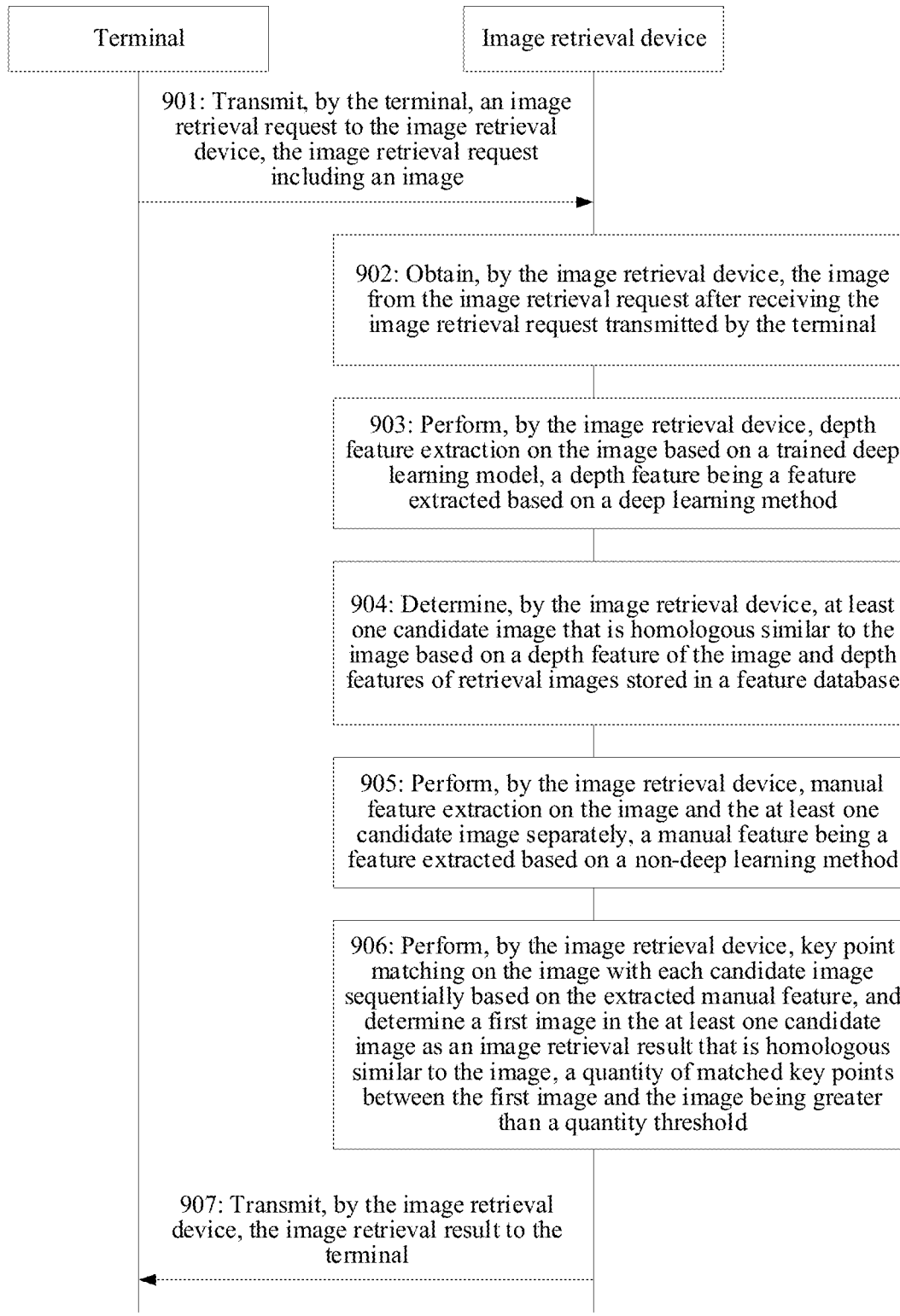
FIG. 9 is a detailed execution flowchart of an image retrieval method according to an embodiment.

Using a scenario in which homologous similar image retrieval is performed as an example, execution of the method involves a terminal, an image retrieval device, and a feature database. Referring to FIG. 9, the detailed execution procedure of the method includes, but is not limited to, the following operations:

901: Transmitting, by the terminal, an image retrieval request to the image retrieval device, the image retrieval request including an image.

902: Obtaining, by the image retrieval device, the image from the image retrieval request after receiving the image retrieval request transmitted by the terminal.

903: Performing, by the image retrieval device, feature extraction on the image based on a trained deep learning model.

904: Determining, by the image retrieval device, at least one candidate image that is homologous similar to the image based on a depth feature of the image and depth features of retrieval images stored in the feature database.

For example, for the at least one candidate image, a process of calculating a feature distance between each candidate image and the image, and comparing the calculated feature distance with the first distance threshold may be further included. In a case that the feature distance is less than the first distance threshold, the candidate image is outputted to the second layer of algorithm logic for manual feature extraction.

905: Performing, by the image retrieval device, manual feature extraction on the image and the at least one candidate image separately.

906: Performing, by the image retrieval device, key point matching processing on the image with each candidate image sequentially based on the extracted manual feature; and determining a first image in the at least one candidate image as an image retrieval result that is homologous similar to the image, a quantity of matched key points between the first image and the image being greater than a quantity threshold.

907: Transmitting, by the image retrieval device, the image retrieval result to the terminal.

The method may provide the following beneficial effects:

According to this embodiment, the depth feature and the manual feature are combined to perform image retrieval, so that advantages of the two features are integrated, where performing image retrieval based on the depth feature has relatively low calculation costs, and performing image retrieval based on the manual feature has advantages in the aspect of retrieval precision. In this embodiment, image retrieval is performed by using a two-layer structure, namely, image retrieval is performed by using two layers of algorithm logic. The first layer of algorithm logic may extract depth features, perform feature distance comparison, perform image screening based on a distance threshold, and input images after screening into the second layer of algorithm logic for manual feature extraction, which greatly reduces a calculation amount of performing image matching by the second layer of algorithm logic based on the manual feature. In addition, the first layer of algorithm logic uses a semi-supervised learning method, so that the depth feature quality may be greatly improved, and this embodiment may effectively improve a recall rate and retrieval precision while ensuring the retrieval efficiency.

The deep learning model is trained by using a model training method, so that when depth feature extraction is performed based on a trained deep learning model, the depth feature quality of retrieval precision may be ensured, and an image recall rate is also ensured, thereby effectively ensuring a coverage capability of the image retrieval method. In addition, in this embodiment, the image retrieval precision may be ensured by SIFT feature-based similarity matching.

Based on the above, in this embodiment, the depth feature quality of the image is ensured through semi-supervised learning, image recall is ensured by using the first layer of algorithm logic, and a calculation magnitude of similarity matching performed by the second layer of algorithm logic based on the manual feature is reduced through threshold control and an image candidate mechanism. The second layer of algorithm logic has relatively high retrieval precision, so that the usability of the image retrieval method may be greatly improved while ensuring the image recall rate and the retrieval precision, thereby shortening an image retrieval time and ensuring the retrieval efficiency.

It is indicated by experimental data that using the first layer of algorithm logic may greatly reduce the calculation amount of the second layer of algorithm logic. Compared with directly performing homologous similarity matching by using SIFT features, the retrieval efficiency of the image retrieval solution provided in this embodiment may be increased linearly as the quantity of retrieval images increases. For example, if TopN=50 and the quantity of retrieval images is 0.1 million, the retrieval efficiency may be increased by 0.1 million/50=2000 times.

In addition, the deep learning model is trained by using the foregoing deep clustering method, so that compared with a pre-trained model based on a public dataset, a recall capability of the deep learning model for similar images is improved by 20%, thereby effectively ensuring the coverage capability of the image retrieval solution. It is verified through experiments, compared with directly performing one-to-one matching by using SIFT features, an image coverage ratio of the image retrieval solution reaches 99% or above.

Based on the above, the image retrieval solution provided in this embodiment may effectively improve the image recall rate and retrieval precision while ensuring the retrieval efficiency.

In addition, although the operations are displayed sequentially according to the instructions of the arrows in the flowcharts of the embodiments, these operations are not necessarily performed sequentially according to the sequence instructed by the arrows. Unless otherwise explicitly specified in this application, execution of the operations is not strictly limited, and the operations may be performed in other sequences. Moreover, at least some of the operations in the foregoing embodiments may include a plurality of sub-operations or a plurality of stages. The sub-operations or the stages are not necessarily performed at the same moment, but may be performed at different moments, which is not specifically limited in the embodiments of this application.

Figure 10:
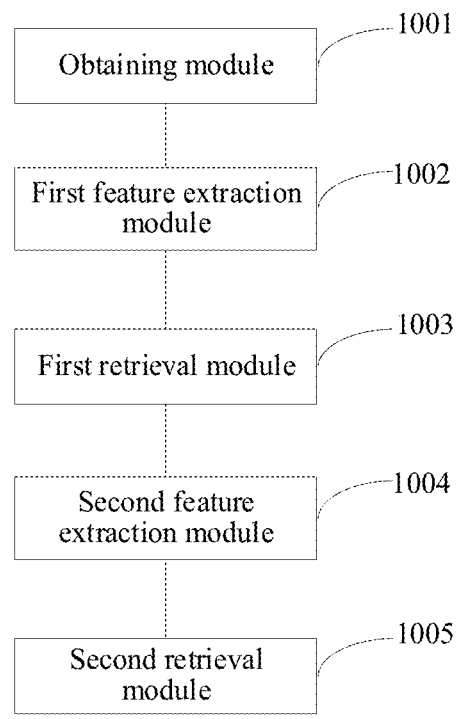
FIG. 10 is a schematic structural diagram of an image retrieval apparatus according to an embodiment.

FIG. 10 is a schematic structural diagram of an image retrieval apparatus according to an embodiment. Referring to FIG. 10, the apparatus includes:

an obtaining module 1001, configured to obtain an image;

a first feature extraction module 1002, configured to perform feature extraction on the image according to a first feature extraction manner to obtain a first feature, the first feature extraction manner being a deep learning-based extraction manner;

a first retrieval module 1003, configured to determine, based on the first feature of the image, at least one candidate image matching the image;

a second feature extraction module 1004, configured to perform feature extraction on the image and each candidate image according to a second feature extraction manner to obtain a second feature, the second feature extraction manner being a non-deep learning-based extraction manner; and a second retrieval module 1005, configured to perform key point matching processing on the image with each candidate image sequentially based on the extracted second feature; and determine a first image in the at least one candidate image as an image retrieval result, a quantity of matched key points between the first image and the image being greater than a quantity threshold.

According to the apparatus provided in this embodiment, image retrieval is performed by combining the first feature with the second feature, the first feature is a feature extracted according to the first feature extraction manner, and the second feature is a feature extracted according to the second feature extraction manner, where the first feature extraction manner is a deep learning-based extraction manner, and the second feature extraction manner is a non-deep learning based extraction manner. In this embodiment, advantages of the two features are integrated, where performing image retrieval based on the first feature has relatively low calculation costs, and performing image retrieval based on the second feature has advantages in the aspect of retrieval precision. Specifically, this embodiment includes two layers of algorithm logic. The first layer of algorithm logic may extract a first feature and performs image screening based on the extracted first feature, and only inputs candidate images obtained through screening into the second layer of algorithm logic for second feature extraction, which greatly reduces a calculation amount of performing image matching based on the second feature by the second layer of algorithm logic, and ensures the retrieval efficiency, and image matching is performed again based on the second feature after images are screened based on the first feature, so that the retrieval precision is ensured. That is, in this embodiment, the image retrieval precision is effectively improved while ensuring the retrieval efficiency.

In a possible implementation, the first feature extraction module is further configured to perform feature extraction on the image based on a deep learning model, the deep learning model being obtained through training based on a first training dataset and a second training dataset, where the first training dataset is a dataset provided with a label, and the second training dataset is a dataset not provided with a label.

In a possible implementation, the deep learning model includes a convolutional neural network (CNN), a clustering branch, and a classification branch, and the apparatus further includes:

a training module, configured to input sample images included in the first training dataset and the second training dataset into the CNN; invoke a clustering model of the clustering branch, iteratively cluster feature data outputted by the CNN, and output an obtained clustering result as a pseudo-label to the classification branch; and invoke a classifier of the classification branch, obtain a loss value based on the pseudo-label, and iteratively update a weight of the CNN according to the loss value.

In a possible implementation, the training module is further configured to obtain the loss value based on the pseudo-label according to the pseudo-label and a classification result of the classifier for the feature data outputted by the CNN.

In a possible implementation, the training module is further configured to obtain normalized mutual information (NMI) of clustering results of two adjacent rounds, the NMI indicating stability of the deep learning model, and a larger value of the NMI indicating that the deep learning model is closer to a convergence state; and determine the convergence state of the deep learning model according to the NMI, and stop the model training process after the deep learning model reaches the convergence state, a convergence condition of the deep learning model being that the value of the NMI reaches a stable value.

In a possible implementation, the first retrieval module is further configured to obtain feature distances between the first feature of the image and first features stored in a feature database, and sort retrieval images corresponding to the stored first features in descending order of the feature distances; and determine a specified quantity of retrieval images ranked top as the at least one candidate image.

In a possible implementation, the second feature extraction module is further configured to obtain a first feature of each candidate image in the at least one candidate image; and obtain a feature distance between the first feature of each candidate image and the first feature of the image, and perform second feature extraction on a second image in the at least one candidate image, where a feature distance between the second image and the image is less than a first distance threshold.

In a possible implementation, the apparatus further includes:

a receiving module, configured to receive an image retrieval request transmitted by a terminal;

the obtaining module being further configured to obtain the image from the image retrieval request; and a transmission module, configured to transmit, after obtaining the image retrieval result, the image retrieval result to the terminal.

In a possible implementation, the second feature extraction module is further configured to perform, for any image on which feature extraction is to be performed, key point detection on the image, to obtain a plurality of key points; and establish a descriptor for each detected key point separately, the descriptor being represented by using a feature vector of a fixed dimension.

In a possible implementation, the second retrieval module is further configured to obtain a first key point descriptor set of the image and a second key point descriptor set of any candidate image; determine a feature distance between any two key point descriptors, one of the any two key point descriptors being from the first key point descriptor set, and the other key point descriptor being from the second key point descriptor set; determine matched key points in the image and the candidate image based on the obtained feature distance, a feature distance corresponding to any pair of matched key points being less than a second distance threshold; and filter the matched key points to obtain final matched key points.

In a possible implementation, the second feature is a scale-invariant feature transform (SIFT) feature.

All of the above-mentioned optional technical solutions may be combined randomly to form optional embodiments of this application, and details are not described herein again.

When the image retrieval apparatus retrieves images, the foregoing embodiment is described by using an example of dividing various functional modules. In actual application, the foregoing function allocation may be completed by different functional modules according to needs. For example, the internal structure of the apparatus may be divided into different functional modules, to complete all or a part of functions of the foregoing functions. In addition, the image retrieval apparatus and image retrieval method embodiments provided in the foregoing embodiments belong to the same concept. For the specific implementation process, reference may be made to the method embodiments, and details are not described herein again.

Figure 11:
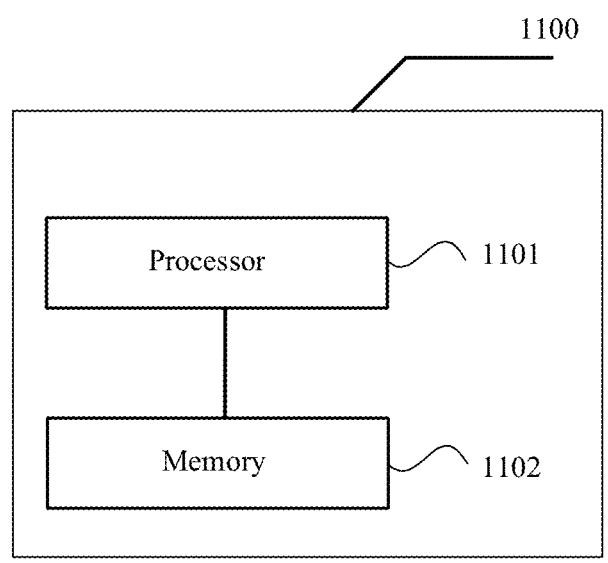
FIG. 11 is a schematic structural diagram of an image retrieval device according to an embodiment.

FIG. 11 is a schematic structural diagram of an image retrieval device according to an embodiment. The device 1100 may vary greatly due to different configurations or performance, and may include one or more processors (for example, central processing units (CPUs)) 1101 and one or more memories 1102. The memory 1102 stores at least one instruction, and the at least one instruction is loaded and executed by the processor 1101 to implement the following operations: obtaining an image, and performing feature extraction on the image according to a first feature extraction manner to obtain a first feature, the first feature extraction manner being a deep learning-based extraction manner; determining, based on the first feature of the image, at least one candidate image matching the image, and performing feature extraction on the image and each candidate image according to a second feature extraction manner to obtain a second feature, the second feature extraction manner being a non-deep learning-based extraction manner; and performing key point matching processing on the image with each candidate image sequentially based on the extracted second feature, and determining a first image in the at least one candidate image as an image retrieval result, a quantity of matched key points between the first image and the image being greater than a quantity threshold.

In some embodiments, the at least one instruction is loaded and executed by the processor 1101 to implement the following operation: performing feature extraction on the image based on a deep learning model, the deep learning model being obtained through training based on a first training dataset and a second training dataset, where the first training dataset is a dataset provided with a label, and the second training dataset is a dataset not provided with a label.

In some embodiments, the deep learning model includes a convolutional neural network (CNN), a clustering branch, and a classification branch, and a training process of the deep learning model includes: inputting sample images included in the first training dataset and the second training dataset into the CNN; invoking a clustering model of the clustering branch, iteratively clustering feature data outputted by the CNN, and outputting an obtained clustering result as a pseudo-label to the classification branch; and invoking a classifier of the classification branch, obtaining a loss value based on the pseudo-label, and iteratively updating a weight of the CNN according to the loss value.

In some embodiments, the obtaining a loss value based on the pseudo-label includes: obtaining the loss value based on the pseudo-label according to the pseudo-label and a classification result of the classifier for the feature data outputted by the CNN.

In some embodiments, the at least one instruction is further loaded and executed by the processor 1101 to implement the following operations: obtaining normalized mutual information (NMI) of clustering results of two adjacent rounds, the NMI indicating stability of the deep learning model, and a larger value of the NMI indicating that the deep learning model is closer to a convergence state; and determining the convergence state of the deep learning model according to the NMI, and stopping the model training process after the deep learning model reaches the convergence state, a convergence condition of the deep learning model being that the value of the NMI reaches a stable value.

In some embodiments, the at least one instruction is loaded and executed by the processor 1101 to implement the following operations: obtaining feature distances between the first feature of the image and first features stored in a feature database, and sorting retrieval images corresponding to the stored first features in descending order of the feature distances; and determining a specified quantity of retrieval images ranked top as the at least one candidate image.

In some embodiments, the at least one instruction is loaded and executed by the processor 1101 to specifically implement the following operations: obtaining a first feature of each candidate image; obtaining a feature distance between the first feature of each candidate image and the first feature of the image, and performing second feature extraction on a second image in the at least one candidate image, where a feature distance between the second image and the image is less than a first distance threshold.

In some embodiments, the at least one instruction is loaded and executed by the processor 1101 to specifically implement the following operations: receiving an image retrieval request transmitted by a terminal, and obtaining the image from the image retrieval request; and after obtaining the image retrieval result, the operations further include: transmitting the image retrieval result to the terminal.

In some embodiments, the at least one instruction is loaded and executed by the processor 1101 to specifically implement the following operations: performing, for any image on which feature extraction is to be performed, key point detection on the image, to obtain a plurality of key points; and establishing a descriptor for each detected key point separately, the descriptor being represented by using a feature vector of a fixed dimension.

In some embodiments, the at least one instruction is loaded and executed by the processor 1101 to specifically implement the following operations: obtaining a first key point descriptor set of the image and a second key point descriptor set of any candidate image; determining a feature distance between any two key point descriptors, one of the any two key point descriptors being from the first key point descriptor set, and the other key point descriptor being from the second key point descriptor set; determining matched key points in the image and the candidate image based on the obtained feature distance, a feature distance corresponding to any pair of matched key points being less than a second distance threshold; and filtering the matched key points to obtain final matched key points.

In some embodiments, the second feature is a scale-invariant feature transform (SIFT) feature.

The device may further have additional components such as a wired or wireless network interface, a keyboard, and an input/output interface for inputting and outputting. The device may further include other components for implementing device functions.

In an embodiment, a computer-readable storage medium, for example, a memory including instructions, is further provided. The instructions may be executed by the processor in the image retrieval device to implement the following operations: obtaining an image, and performing feature extraction on the image according to a first feature extraction manner to obtain a first feature, the first feature extraction manner being a deep learning-based extraction manner; determining, based on the first feature of the image, at least one candidate image matching the image, and performing feature extraction on the image and each candidate image according to a second feature extraction manner to obtain a second feature, the second feature extraction manner being a non-deep learning-based extraction manner; and performing key point matching processing on the image with each candidate image sequentially based on the extracted second feature, and determining a first image in the at least one candidate image as an image retrieval result, a quantity of matched key points between the first image and the image being greater than a quantity threshold.

In some embodiments, the at least one instruction is loaded and executed by the processor to implement the following operation: performing feature extraction on the image based on a deep learning model, the deep learning model being obtained through training based on a first training dataset and a second training dataset, where the first training dataset is a dataset provided with a label, and the second training dataset is a dataset not provided with a label.

In some embodiments, the deep learning model includes a convolutional neural network (CNN), a clustering branch, and a classification branch, and a training process of the deep learning model includes: inputting sample images included in the first training dataset and the second training dataset into the CNN; invoking a clustering model of the clustering branch, iteratively clustering feature data outputted by the CNN, and outputting an obtained clustering result as a pseudo-label to the classification branch; and invoking a classifier of the classification branch, obtaining a loss value based on the pseudo-label, and iteratively updating a weight of the CNN according to the loss value.

In some embodiments, the obtaining a loss value based on the pseudo-label includes: obtaining the loss value based on the pseudo-label according to the pseudo-label and a classification result of the classifier for the feature data outputted by the CNN.

In some embodiments, the at least one instruction is further loaded and executed by the processor to implement the following operations: obtaining normalized mutual information (NMI) of clustering results of two adjacent rounds, the NMI indicating stability of the deep learning model, and a larger value of the NMI indicating that the deep learning model is closer to a convergence state; and determining the convergence state of the deep learning model according to the NMI, and stopping the model training process after the deep learning model reaches the convergence state, a convergence condition of the deep learning model being that the value of the NMI reaches a stable value.

In some embodiments, the at least one instruction is loaded and executed by the processor to implement the following operations: obtaining feature distances between the first feature of the image and first features stored in a feature database, and sorting retrieval images corresponding to the stored first features in descending order of the feature distances; and determining a specified quantity of retrieval images ranked top as the at least one candidate image.

In some embodiments, the at least one instruction is loaded and executed by the processor to specifically implement the following operations: obtaining a first feature of each candidate image; obtaining a feature distance between the first feature of each candidate image and the first feature of the image, and performing second feature extraction on a second image in the at least one candidate image, where a feature distance between the second image and the image is less than a first distance threshold.

In some embodiments, the at least one instruction is loaded and executed by the processor to specifically implement the following operations: receiving an image retrieval request transmitted by a terminal, and obtaining the image from the image retrieval request; and after obtaining the image retrieval result, the operations further include: transmitting the image retrieval result to the terminal.

In some embodiments, the at least one instruction is loaded and executed by the processor to specifically implement the following operations: performing, for any image on which feature extraction is to be performed, key point detection on the image, to obtain a plurality of key points; and establishing a descriptor for each detected key point separately, the descriptor being represented by using a feature vector of a fixed dimension.

In some embodiments, the at least one instruction is loaded and executed by the processor to specifically implement the following operations: obtaining a first key point descriptor set of the image and a second key point descriptor set of any candidate image; determining a feature distance between any two key point descriptors, one of the any two key point descriptors being from the first key point descriptor set, and the other key point descriptor being from the second key point descriptor set; determining matched key points in the image and the candidate image based on the obtained feature distance, a feature distance corresponding to any pair of matched key points being less than a second distance threshold; and filtering the matched key points to obtain final matched key points.

In some embodiments, the second feature is a scale-invariant feature transform (SIFT) feature.

For example, the computer-readable storage medium may be a non-transitory storage medium. For example, the computer-readable storage medium may be a read-only memory (ROM), a random access memory (RAM), a compact disc read-only memory (CD-ROM), a magnetic tape, a floppy disk, an optical data storage device, and the like.

A person of ordinary skill in the art may understand that all or some of the operations of the foregoing embodiments may be implemented by hardware, or may be implemented by a program instructing relevant hardware. The program may be stored in a computer-readable storage medium. The storage medium may be a ROM, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. An image retrieval method, performed by at least one processor of an image retrieval device, and comprising:
obtaining an image;
performing feature extraction on the image according to a first feature extraction manner to obtain a first feature, the first feature extraction manner being a deep learning-based extraction manner and the first feature being a depth feature;
determining, based on the first feature of the image, at least one candidate image matching the image;
performing feature extraction on the image and each of the at least one candidate image according to a second feature extraction manner to obtain a second feature, the second feature extraction manner being a non-deep learning-based extraction manner;
sequentially performing key point matching processing on the image with each of the at least one candidate image based on the extracted second feature;
determining a first image, from among the at least one candidate image, as an image retrieval result, based on a quantity of matched key points between the first image and the image being greater than a quantity threshold; and
transmitting the image retrieval result.

2. The image retrieval method according to claim 1, wherein the performing feature extraction on the image according to the first feature extraction manner comprises performing feature extraction on the image based on a deep learning model, the deep learning model being obtained through training based on a first training dataset and a second training dataset, and
wherein the first training dataset is a dataset provided with a label, and the second training dataset is a dataset not provided with a label.

3. The image retrieval method according to claim 2, wherein the deep learning model comprises a convolutional neural network (CNN), a clustering branch, and a classification branch, and
wherein a training process of the deep learning model comprises:
inputting sample images comprised in the first training dataset and the second training dataset into the CNN;
invoking a clustering model of the clustering branch;
iteratively clustering feature data outputted by the CNN;
outputting an obtained clustering result as a pseudo-label to the classification branch;
invoking a classifier of the classification branch;
obtaining a loss value based on the pseudo-label; and
iteratively updating a weight of the CNN according to the loss value.

4. The image retrieval method according to claim 3, wherein the obtaining the loss value based on the pseudo-label comprises obtaining the loss value based on the pseudo-label according to the pseudo-label and a classification result of the classifier for the feature data outputted by the CNN.

5. The image retrieval method according to claim 3, further comprising:
obtaining normalized mutual information (NMI) of clustering results of two adjacent rounds, the NMI indicating stability of the deep learning model, and a larger value of the NMI indicating that the deep learning model is closer to a convergence state;
determining the convergence state of the deep learning model according to the NMI; and
stopping the training process after the deep learning model reaches the convergence state, a convergence condition of the deep learning model being that the value of the NMI reaches a stable value.

6. The image retrieval method according to claim 5, wherein the determining, based on the first feature of the image, the at least one candidate image comprises:
obtaining feature distances between the first feature of the image and first features stored in a feature database;
sorting retrieval images corresponding to the stored first features in descending order of the feature distances; and
determining a specified quantity of retrieval images ranked top as the at least one candidate image.

7. The image retrieval method according to claim 5, wherein the performing feature extraction on each of the at least one candidate image comprises:
obtaining a first feature of each of the at least one candidate image;
obtaining a feature distance between the first feature of each of the at least one candidate image and the first feature of the image; and
performing second feature extraction on a second image in the at least one candidate image, and
wherein a feature distance between the second image and the image is less than a first distance threshold.

8. The image retrieval method according to claim 5, wherein the obtaining the image comprises:
receiving an image retrieval request transmitted by a terminal; and
obtaining the image from the image retrieval request, and
wherein the image retrieval method further comprises, after obtaining the image retrieval result, transmitting the image retrieval result to the terminal.

9. The image retrieval method according to claim 5, wherein the performing feature extraction on the image and each of the at least one candidate image according to the second feature extraction manner comprises:
performing, for any image on which feature extraction is to be performed, key point detection on the image, to obtain a plurality of key points; and
establishing a descriptor for each detected key point separately, the descriptor being represented by using a feature vector of a fixed dimension.

10. The image retrieval method according to claim 9, wherein the sequentially performing key point matching processing on the image with each of the at least one candidate image based on the extracted second feature comprises:
obtaining a first key point descriptor set of the image and a second key point descriptor set of any candidate image;
determining a feature distance between any a first key point descriptor and a second key point descriptor, the first key point descriptor being from the first key point descriptor set, and the second key point descriptor being from the second key point descriptor set;

determining matched key points in the image and the candidate image based on the obtained feature distance, a feature distance corresponding to any pair of matched key points being less than a second distance threshold; and filtering the matched key points to obtain final matched key points.

11. The image retrieval method according to claim 5, wherein the second feature is a scale-invariant feature transform (SIFT) feature.

12. An image retrieval device, comprising:
at least one memory configured to store program code; and
at least one processor configured to read the program code and operate as instructed by the program code, the program code comprising:
first obtaining code configured to cause at least one of the at least one processor to obtain an image;
first performing code configured to cause at least one of the at least one processor to perform feature extraction on the image according to a first feature extraction manner to obtain a first feature, the first feature extraction manner being a deep learning-based extraction manner and the first feature being a depth feature;
first determining code configured to cause at least one of the at least one processor to determine, based on the first feature of the image, at least one candidate image matching the image;
second performing code configured to cause at least one of the at least one processor to perform feature extraction on the image and each of the at least one candidate image according to a second feature extraction manner to obtain a second feature, the second feature extraction manner being a non-deep learning-based extraction manner;
third performing code configured to cause at least one of the at least one processor to sequentially perform key point matching processing on the image with each of the at least one candidate image based on the extracted second feature;
second determining code configured to cause at least one of the at least one processor to determine a first image, from among the at least one candidate image, as an image retrieval result based on a quantity of matched key points between the first image and the image being greater than a quantity threshold; and
transmitting code configured to cause at least one of the at least one processor to transmit the image retrieval result.

13. The image retrieval device according to claim 12, wherein the first performing code is further configured to cause at least one of the at least one processor to perform feature extraction on the image based on a deep learning model, the deep learning model being obtained through training based on a first training dataset and a second training dataset, and
wherein the first training dataset is a dataset provided with a label, and the second training dataset is a dataset not provided with a label.

14. The image retrieval device according to claim 13, wherein the deep learning model comprises a convolutional neural network (CNN), a clustering branch, and a classification branch, and
wherein the program code further comprises training code configured to cause at least one of the at least one processor to perform a training process of the deep learning model, the training process comprising:
inputting sample images comprised in the first training dataset and the second training dataset into the CNN;
invoking a clustering model of the clustering branch;
iteratively clustering feature data outputted by the CNN;
outputting an obtained clustering result as a pseudo-label to the classification branch;
invoking a classifier of the classification branch;
obtaining a loss value based on the pseudo-label; and
iteratively updating a weight of the CNN according to the loss value.

15. The image retrieval device according to claim 14, wherein the obtaining the loss value based on the pseudo-label comprises:
obtaining the loss value based on the pseudo-label according to the pseudo-label and a classification result of the classifier for the feature data outputted by the CNN.

16. The image retrieval device according to claim 14, wherein the program code further comprises:
second obtaining code configured to cause at least one of the at least one processor to obtain normalized mutual information (NMI) of clustering results of two adjacent rounds, the NMI indicating stability of the deep learning model, and a larger value of the NMI indicating that the deep learning model is closer to a convergence state;
determining code configured to cause at least one of the at least one processor to determine the convergence state of the deep learning model according to the NMI; and
stopping code configured to cause at least one of the at least one processor to stop the training process after the deep learning model reaches the convergence state, a convergence condition of the deep learning model being that the value of the NMI reaches a stable value.

17. The image retrieval device according to claim 16, wherein the first determining code is further configured to cause at least one of the at least one processor to:
obtain feature distances between the first feature of the image and first features stored in a feature database;
sort retrieval images corresponding to the stored first features in descending order of the feature distances; and
determine a specified quantity of retrieval images ranked top as the at least one candidate image.

18. The image retrieval device according to claim 16, wherein the first performing code is further configured to cause at least one of the at least one processor to:
obtain a first feature of each candidate image;
obtain a feature distance between the first feature of each of the at least one candidate image and the first feature of the image; and
perform second feature extraction on a second image in the at least one candidate image, and
wherein a feature distance between the second image and the image is less than a first distance threshold.

19. The image retrieval device according to claim 16, wherein the obtaining code is further configured to cause at least one of the at least one processor to receive an image retrieval request transmitted by a terminal and obtain the image from the image retrieval request, and
wherein the transmitting code is further configured to cause at least one of the at least one processor to transmit the image retrieval result to the terminal.

20. A non-transitory computer readable storage medium, storing at least one instruction executable by at least one processor to perform an image retrieval method comprising:
- obtaining an image;
- performing feature extraction on the image according to a first feature extraction manner to obtain a first feature, the first feature extraction manner being a deep learning-based extraction manner and the first feature being a depth feature;
- determining, based on the first feature of the image, at least one candidate image matching the image;
- performing feature extraction on the image and each of the at least one candidate image according to a second feature extraction manner to obtain a second feature, the second feature extraction manner being a non-deep learning-based extraction manner;
- sequentially performing key point matching processing on the image with each of the at least one candidate image based on the extracted second feature;
- determining a first image, from among the at least one candidate image, as an image retrieval result, based on a quantity of matched key points between the first image and the image being greater than a quantity threshold; and
- transmitting the image retrieval result.

* * * * *